(12) United States Patent
Devireddy et al.

(10) Patent No.: US 8,953,629 B2
(45) Date of Patent: Feb. 10, 2015

(54) BLADE ROUTER WITH NAT SUPPORT

(75) Inventors: Dileep Kumar Devireddy, San Jose, CA (US); Michael Smith, San Jose, CA (US); Saravanakumar Rajendran, San Jose, CA (US); Pradeep K. Kathail, Los Altos, CA (US); Chandrashekhar Appanna, Cupertino, CA (US); Jeffrey Ym Wang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 108 days.

(21) Appl. No.: 12/037,669

(22) Filed: Feb. 26, 2008

(65) Prior Publication Data

US 2009/0213867 A1  Aug. 27, 2009

(51) Int. Cl.
*H04L 12/56* (2006.01)
*H04L 29/12* (2006.01)
*G06F 13/38* (2006.01)

(52) U.S. Cl.
CPC .......... *G06F 13/387* (2013.01); *H04L 61/6077* (2013.01); *H04L 61/2514* (2013.01)
USPC ....................................................... 370/419

(58) Field of Classification Search
None
See application file for complete search history.

(56) References Cited

U.S. PATENT DOCUMENTS

| 6,650,641 | B1* | 11/2003 | Albert et al. | 370/392 |
|---|---|---|---|---|
| 7,292,569 | B1* | 11/2007 | Smith et al. | 370/383 |
| 7,424,014 | B2* | 9/2008 | Mattes et al. | 370/389 |
| 7,640,319 | B1* | 12/2009 | Sylvain et al. | 709/218 |
| 2002/0024950 | A1* | 2/2002 | Fink et al. | 370/389 |
| 2002/0103920 | A1* | 8/2002 | Berkun et al. | 709/231 |
| 2002/0103921 | A1* | 8/2002 | Nair et al. | 709/232 |
| 2002/0131436 | A1* | 9/2002 | Suri | 370/419 |
| 2002/0141421 | A1* | 10/2002 | Dupont | 370/403 |
| 2003/0233475 | A1* | 12/2003 | Maufer et al. | 709/245 |
| 2005/0091396 | A1* | 4/2005 | Nilakantan et al. | 709/232 |
| 2006/0013209 | A1* | 1/2006 | Somasundaram | 370/389 |
| 2007/0168475 | A1* | 7/2007 | Mullahy et al. | 709/220 |
| 2008/0043769 | A1* | 2/2008 | Hirai | 370/420 |
| 2008/0101357 | A1* | 5/2008 | Iovanna et al. | 370/389 |

* cited by examiner

*Primary Examiner* — Steve Young
(74) *Attorney, Agent, or Firm* — Patterson & Sheridan, LLP

(57) ABSTRACT

A blade router for increased interface scalability is provided. The blade router may address interface scalability by having each of the linecards manage its interfaces locally and may use the concept of virtual and local interfaces for intelligent forwarding. The blade router may appear as a single router from the customer perspective during configuration. For some embodiments, two virtual interfaces may be used, one for regular interface traffic and another for Network Address Translation (NAT)-enabled interface traffic.

12 Claims, 6 Drawing Sheets

BLADE ROUTER WITH NAT SUPPORT

BACKGROUND OF THE INVENTION

1. Field of the Invention

Embodiments of the present invention generally relate to the field of network communication, and more particularly, to interface scalability when increasing the number of router linecards within a single chassis.

2. Description of the Related Art

As the number of clients or networks having destination IP addresses increases for an Internet Service Provider (ISP) or a growing large company, network complexity and, thus, the demand for more router interfaces also scale accordingly. Routing systems containing several slots for connecting router linecards have been designed in an effort to meet the demand for routers with a large number of interfaces, both physical and logical. However, scalability in terms of the number of interfaces and associated operations supported by a single router remains a problem. For example, conventional routing systems that typically use a single operating system do not scale well because of the increased number of Address Resolution Protocol (ARP) requests impingement on the routing system with an increased number of network connections.

Accordingly, techniques for successfully scaling the number of interfaces within a routing system are needed.

Overview

Embodiments of the present invention generally relate to network routing systems for addressing interface scalability.

One embodiment of the present invention provides a network routing system. The routing system generally includes a chassis, a plurality of router linecards disposed in the chassis, and first and second virtual interfaces for routing between two or more of the plurality of router linecards, wherein each of the router linecards maintains a forwarding information base (FIB) for directing incoming packets to a local interface or to the first and second virtual interfaces to be received by other router linecards in the plurality.

Another embodiment of the present invention is a method. The method generally includes receiving a packet in a first router linecard of a plurality of router linecards disposed in a chassis, forwarding the packet from the first router linecard to a first or a second virtual interface for routing between two or more of the plurality of router linecards based on one or more selection criteria, and receiving the packet from the first or the second virtual interface in a second router linecard of the plurality of router linecards.

Yet another embodiment of the present invention is a method. The method generally includes configuring an FIB of a first router linecard of a plurality of router linecards disposed in a chassis to forward a packet to a first virtual interface for routing between two or more of the plurality of router linecards if the packet is to be forwarded to a second router linecard in the plurality and if the packet meets one or more selection criteria; and configuring the FIB of the first router linecard to forward the packet to a second virtual interface for routing between the two or more of the plurality of router linecards if the packet is to be forwarded to the second router linecard and if the packet does not meet the one or more selection criteria.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Embodiments of the present invention provide a blade router to address interface scalability and permit an increased number of router linecards supported within a single chassis.

An Example Blade Router

Figure 1:
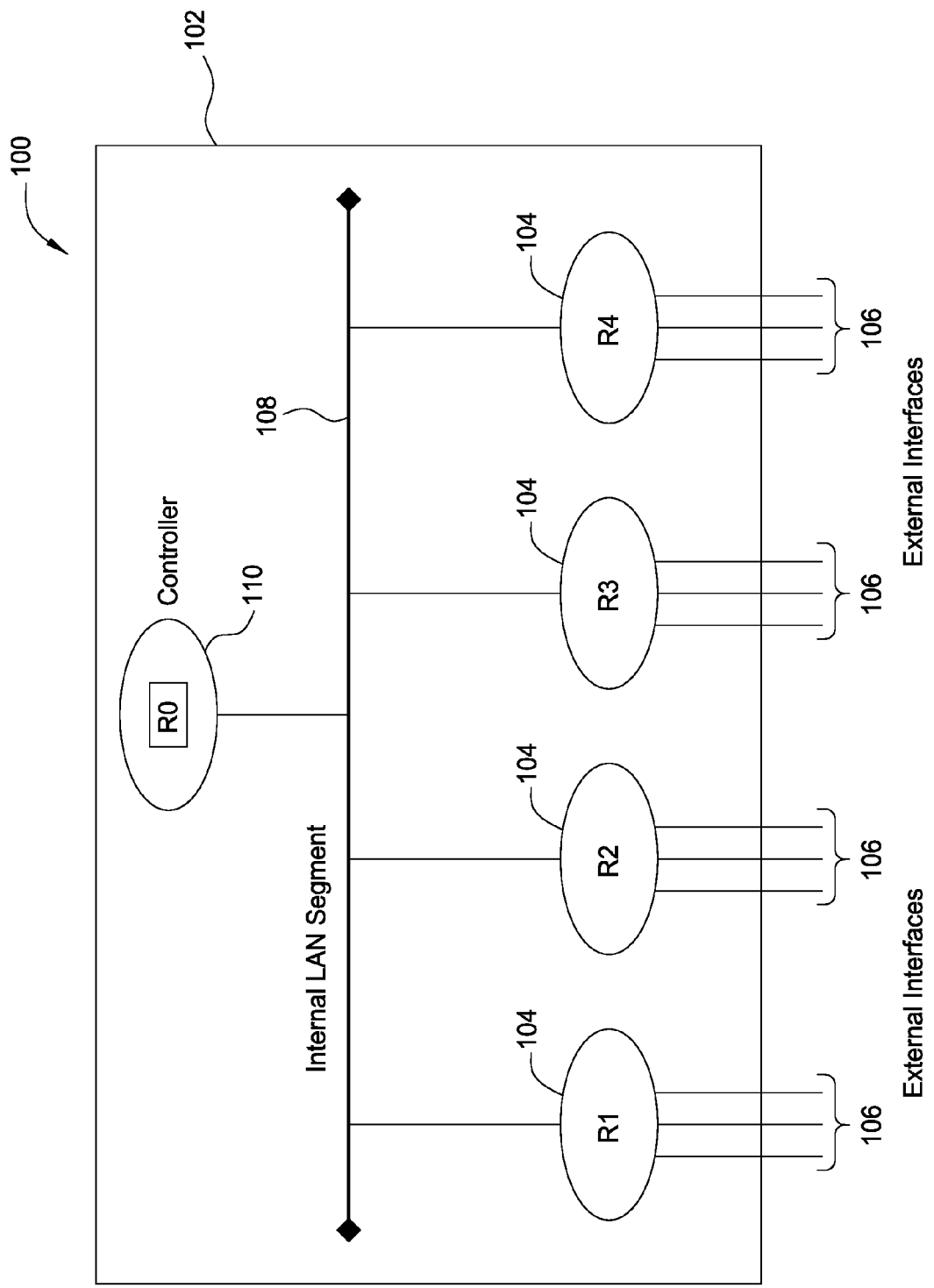
FIG. 1 is a block diagram of a router network-in-a-box in accordance with an embodiment of the present invention.

FIG. 1 is a block diagram of an example blade router 100 according to an embodiment of the invention. The blade router 100 may comprise a chassis 102 having a backplane and a plurality of slots. Router linecards 104 (also known as router blades and labeled R1-R4 in FIG. 1) may be disposed in the slots of the chassis 102 and electrically coupled to the backplane. The number of slots may dictate the number of router linecards 104 the chassis 102 may hold. Although only four router linecards 104 are shown in FIG. 1, this is representative of any number of linecards that may be disposed within a blade router chassis (e.g., 44 or 128 linecards). Moreover, an operable blade router may have empty slots where the chassis 102 has more available slots than router linecards 104 used for a given application.

Each router linecard 104 may have a plurality of external interfaces 106 for coupling the router linecard 104 to an external network, such as an external router, a switch, a server, or a client. These external interfaces 106 may be for wireless transmission or physical connection to any suitable cable, such as Cat-5 cable, for high-speed data transmission. The physical external interfaces 106 and any logical interfaces for a given router linecard 104 may be considered as the local interfaces for that router linecard 104. Each router linecard 104 may also be coupled to an internal local area network (LAN) segment 108 for routing between the linecards 104. Physically, the internal LAN segment 108 may be located within the backplane (e.g., as a trace within the printed circuit board (PCB) of the backplane), and the individual router linecards 104 may be coupled to the internal LAN segment 108 by being connected to the backplane.

Furthermore, a controller 110 (labeled R0 in FIG. 1) may be coupled to the router linecards 104 in an effort to manage and configure the routing information for the individual router linecards 104. To manage the router linecards 104, the controller 110 may run an operating system. The controller 110 may be disposed within a separate area of the chassis 102 from the router linecards 104 or have a designated slot. For some embodiments, the controller 110 may be coupled to the linecards 104 via the internal LAN segment 108 as shown.

The chassis 102 may be composed of any suitable material, such as metal, for providing a rigid structure in which to contain and protect elements disposed within (e.g., the router linecards 104) and for acting as a Faraday shield against electrical noise. For some embodiments, the chassis 102 may also contain one or more fans (not shown) in an effort to provide air circulation and, thus, forced convective cooling of the router linecards 104. Furthermore, a power supply (not shown) may be disposed within the chassis 102 and may serve to convert AC power, such as 120 $V_{rms}$ from a wall outlet, to one or more DC voltages for use by the router linecards 104, the controller 110, and the fan(s). The power supply may be coupled to the backplane for power distribution to the router linecards 104 and the controller 110.

In the blade router 100, each router linecard 104 may own the interfaces locally. In other words, each router linecard 104 may store and maintain its own forwarding information base (FIB), also known as a forwarding table, for making routing decisions. Hence, the controller 110 does not need to control the data packets during operation of the blade router 100. This is in contrast to conventional systems where the controller typically distributes the FIB to the blades and controls the data forwarding. Used to find the proper interface to which an input interface should send a packet to be transmitted by the router linecard, the FIB may be directed toward fast lookup of destination addresses. From a data plane perspective, the blade router 100 may behave substantially similar to multiple routers in a network, although the routers of the blade router (i.e., the linecards 104) are contained within a single chassis 102, thereby leading to the concept of a "network-in-a-box" so to speak. By conceptually having each linecard in the chassis 102 function as an independent router, the system software may be scaled to support a large number of interfaces.

To configure the blade router 100, the customer may interface with the controller 110, which handles the global aspects of the blade router 100, via software, such as the controller's operating system. From the customer and control plane perspectives, the blade router 100 may appear as a single router. However, once the customer has completed configuration of the blade router 100, the FIB for each router linecard 104 may be updated and stored locally. The blade router 100 may configure only a single virtual interface, such as the internal LAN segment 108, for the network fabric within the chassis 102.

In the control plane, any suitable routing protocol may be used, such as Border Gateway Protocol (BGP), Enhanced Interior Gateway Routing Protocol (E-IGRP), Open Shortest Path First (OSPF), intermediate system to intermediate system (IS-IS), multicast routing protocols, and Multiprotocol Label Switching (MPLS). For example, with BGP the controller 110 may be a BGP instance and function as the route reflector (RR). Each of the router linecards 104 may be a BGP instance and function as an RR client, and the BGP peering load may be distributed to the router linecards 104. The RR at the controller 110 may handle summarizing updates and sending the updates to all of the BGP instances internal to the blade router 100. No matter the routing protocol selected, the blade router 100 may behave as multiple routers connected over a single LAN segment from the data plane perspective as described above.

With the virtual interface configured by the controller 110, the blade router 100 may employ intelligent forwarding through the fabric by dividing the routes into two groups: local interfaces and virtual interfaces. Local interfaces, as used herein, may be generally defined as interfaces (both physical and logical) that are local to a given router linecard 104. A virtual interface, as used herein, may be generally defined as an interface for the blade router model that identifies the shared segment connecting the linecards. With these two groups, the intelligent forwarding may be known as two-stage, or split, forwarding. Based on the destination, the FIB for each router linecard 104 may indicate routing incoming data packets to a local interface, local to that particular linecard, or to the virtual interface for routing to another router linecard 104 within the chassis 102 of the blade router 100. In other words, the virtual interface may be a global internal virtual LAN (VLAN) used for forwarding across the linecards 104. These local and virtual interfaces may operate on Layer 3 (L3, the network layer) of the Open Systems Interconnection Reference Model (OSI model). Conventionally on a shared LAN segment, the data packets are received by every node on the segment. With intelligent forwarding, however, packet forwarding is performed as if the linecards were connected with point-to-point links, which will be described in further detail below. Furthermore, mechanisms may be implemented in an effort to ensure that the internal routes of the virtual interface are preferred over any possible routes existing outside of the blade router's chassis 102.

With the concept of intelligent forwarding, local switching within a certain router linecard 104 in the blade router 100 may most likely have the same performance as in a conventional routing system with the same router linecard. However, because of the two lookups in intelligent forwarding when packets are routed between linecards in the blade router 100, the performance may be slightly reduced when compared to a conventional routing system with the same router linecards.

By localizing the forwarding decisions for a linecard in the blade router 100, each of the router linecards 104 may run a separate instance of an operating system, such as Cisco's Internetwork Operating System (IOS). Moreover, in the blade router 100, each of the router linecards 104 within the chassis 102 may run a different version of the operating system. This may allow for scaling the number of router linecards 104 in the blade router 100 with operating system feature/code development. Furthermore, because forwarding is localized on each linecard, each of the router linecards 104 may support a different version of the forwarding engine, such as Cisco's Enhanced Address Recognition Logic (EARL), within the routing application specific integrated circuit (ASIC). In other words, mixed mode EARLs may be supported.

Allowing for different operating systems and different forwarding engines may permit a "pay-as-you-go" model, where customers may upscale their blade routers by adding new router linecards potentially with upgraded features without discarding legacy linecards. In this manner, scalability is not hindered by the costs of having to replace legacy linecards when upgrading a network routing system, such as the blade router 100.

Even though the blade router 100 may appear as a single system from the control plane perspective, each router linecard 104 may run a separate operating system instance and, thus, may be independently managed from the management plane perspective. The controller 110 may have a single internet protocol (IP) address with session support, and commands and/or features for blade router management may be executed on the controller 110. Furthermore, some embodiments may include an option to telnet directly to a certain linecard 104 for debugging and network management. In other words, the blade router 100 may allow a user to connect to the controller 110 and then select an individual router linecard 104 for management and/or debugging. For some embodiments, the blade router 100 may allow a user to connect to the controller 110 and manage either all or a subset of the plurality of router linecards 104 as a single entity. In the management plane, the blade router 100 may allow the router linecards 104 to be partitioned based on the operating system version they are running for some embodiments. By allowing linecards running the same version and image of the operating system to be managed as a single entity, a command translation table need not be maintained. Also for some embodiments, the blade router 100 may have provisions for specifying a subset of the router linecards 104 as the destination for specified commands.

Unicast Forwarding Example

Figure 2:
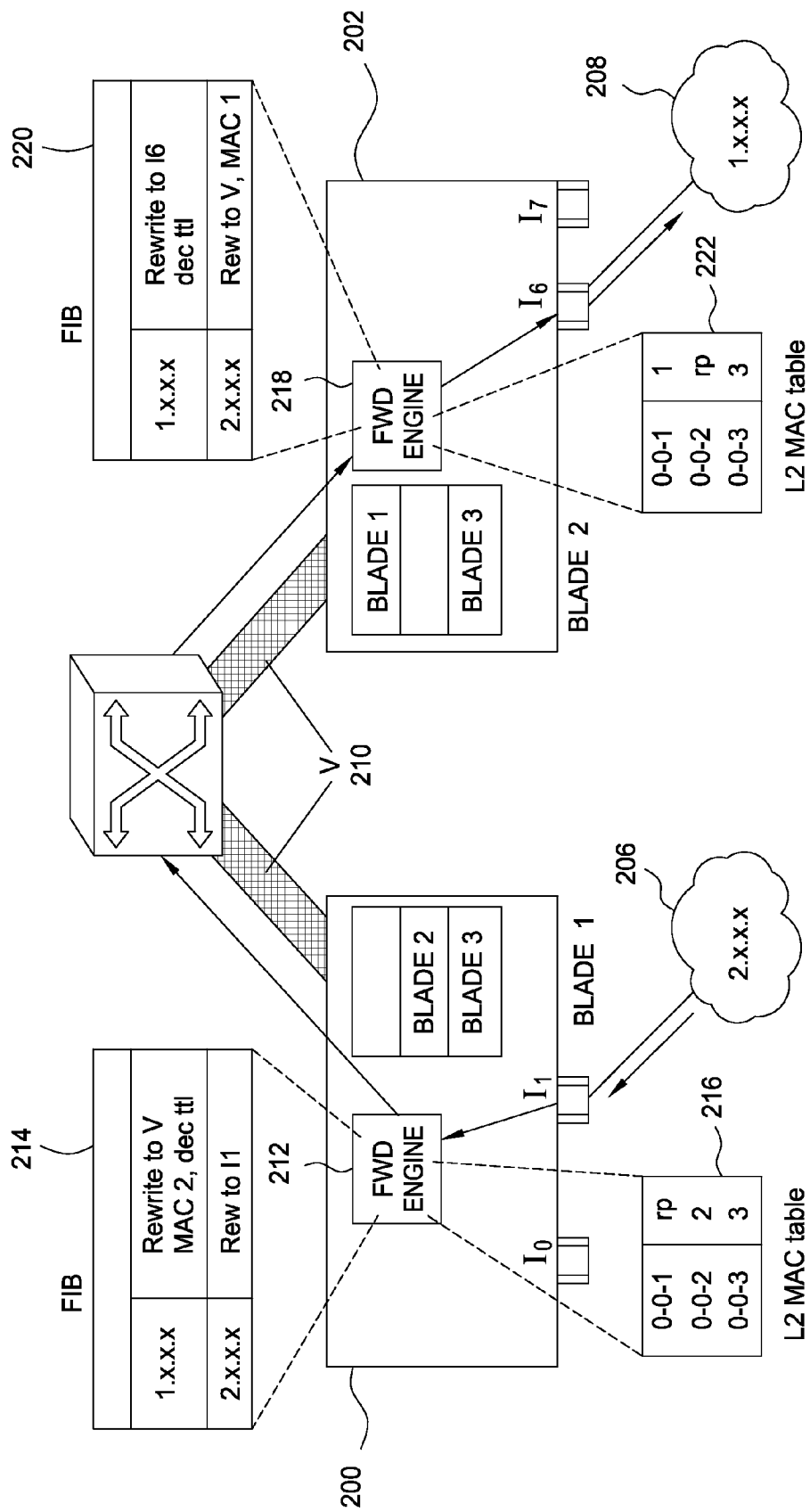
FIG. 2 illustrates blade-to-blade unicast forwarding within the blade router in accordance with an embodiment of the present invention.

The blade router 100 may support several different types of linecard-to-linecard (blade-to-blade) forwarding from the data plane perspective. FIG. 2 illustrates blade-to-blade unicast forwarding within the blade router according to some embodiments of the present invention. In computer networks, unicast forwarding is the sending of data packets to a single destination, and duplicate data streams may be transmitted if more than one destination is to receive a particular data packet.

As shown in FIG. 2, the blade router 100 may contain a first router linecard 200 labeled BLADE 1 and a second router linecard 202 labeled BLADE 2. The first router linecard 200 may have two local ports 204 labeled $I_0$ and $I_1$, and the second router linecard 202 may have two local ports 204 labeled $I_6$ and $I_7$. Although FIG. 2 depicts only two local ports per router linecard, each linecard may have many more local ports for interfacing with a network external to the blade router 100. Interface $I_1$ may be coupled to a network 206 having an IP subnet of 2.x.x.x, for example. Interface $I_6$ may be coupled to a network 208 having an IP subnet of 1.x.x.x. The first and second router linecards 200, 202 may be coupled by the virtual interface (V) 210 for blade-to-blade routing.

The forwarding engine 212, such as EARL, within the first router linecard 200 may contain a forwarding information base (FIB) 214 after configuration of the blade router 100 that indicates routing incoming data packets to a local interface, such as $I_0$ and $I_1$, or to the virtual interface 210. For example, if a data packet is received in the first router linecard 200 with a destination address in the subnet of 2.x.x.x, the FIB 214 may contain routing instructions to rewrite the packet to local interface $I_1$. However, if the data packet has a destination address in the subnet of 1.x.x.x, there may not be a local interface on BLADE 1 to route the data packet to reach the network 208. Instead the data packet should be routed over the fabric link. Thus, the FIB 214 may contain an entry to rewrite data packets with a destination address in the subnet of 1.x.x.x to the virtual interface 210 based on the Media Access Control (MAC) address of BLADE 2.

The MAC address may be based on the slot number of the router linecard within the chassis 102 of the blade router 100 having the correct local port coupled to the destination network. According to the L2 MAC table 216 for the first router linecard 200 (L2 standing for Layer 2, the data link layer of the OSI model), the MAC address for BLADE 2, the second router linecard 202, is 2. Therefore, the FIB 214 entry for data packets with a destination address in the subnet of 1.x.x.x should be to rewrite data packets to V, MAC 2 as illustrated. Thus, even though multiple router linecards, may be coupled to the virtual interface 210, the MAC addressing used in conjunction with the virtual interface routing in the first portion of intelligent forwarding allows data packets to be forwarded as if the linecards (such as BLADE 1 and BLADE 2) were connected with point-to-point links.

In a similar manner, the forwarding engine 218, such as EARL, within BLADE 2, the second router linecard 202, may contain a forwarding information base (FIB) 220 after configuration of the blade router 100 that indicates routing incoming data packets to a local interface, such as $I_6$ and $I_7$, or to the virtual interface 210. For example, if a data packet is received in the second router linecard 202 with a destination address in the subnet of 1.x.x.x, the FIB 220 may contain routing instructions to rewrite the packet to local interface $I_6$. However, if the data packet has a destination address in the subnet of 2.x.x.x, there may not be a local interface on BLADE 2 to route the data packet to reach the network 206. Thus, the FIB 220 may contain an entry to rewrite data packets with a destination address in the subnet of 2.x.x.x to the virtual interface 210. According to the L2 MAC table 222 for the second router linecard 202, the MAC address for BLADE 1, the first router linecard 200, is 1. Therefore, the FIB 220 entry for data packets with a destination address in the subnet of 2.x.x.x should be to rewrite data packets to V, MAC 1 as illustrated.

During unicast forwarding according to embodiments of the invention and as illustrated in FIG. 2 as an example, an incoming data packet may be received from network 206 on interface $I_1$. An Access Control List (ACL) and Quality of Service (QoS) lookup may be performed on the input interface ($I_1$ in this example). ACL, as used herein, may be generally defined as a list of permissions attached to an object specifying who or what is allowed to access the object and what operations are permitted to be performed on the object. QoS, as used herein, may be generally defined as a resource reservation control mechanism, which can provide different priority to different users or data flows or guarantee a certain level of performance to a data flow in accordance with requests from the application program or the Internet Service Provider (ISP) policy.

After the ACL and QoS policies are established for the data packet, the ingress forwarding engine 212, such as EARL, may perform an FIB lookup into FIB 214. Since the packet has a destination address in the subnet of 1.x.x.x, the FIB adjacency may rewrite the packet to interface V, MAC 2 as described above. There need not be any output ACL/QoS policies on the virtual interface (V) 210. The L2 lookup for BLADE 2 may point to the fabric link of the second router linecard 202, the fabric may set the card type to a special value, and BLADE 2 may force an L3 lookup. There may most likely not be any input ACL/QoS policies on V 210 either. The egress forwarding engine 218 may perform a second FIB lookup, and FIB adjacency may rewrite the data packet to interface $I_6$ according to FIB 220. The data packet may then leave the blade router 100 out of interface $I_6$ bound for network 208 with an IP address in the subnet of 1.x.x.x.

Multicast Forwarding Example

Figure 3:
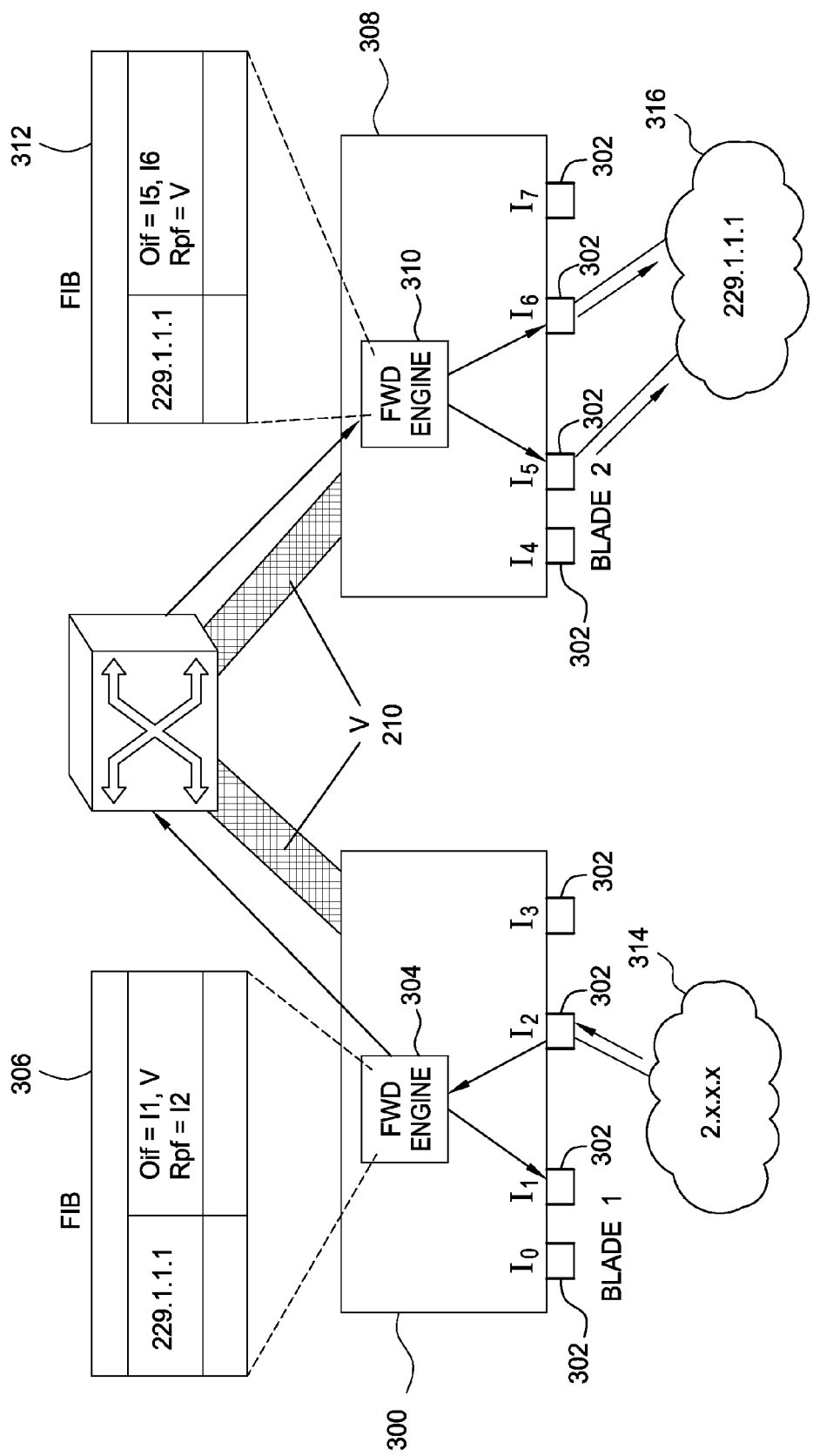
FIG. 3 illustrates multicast forwarding between blades within the blade router in accordance with an embodiment of the present invention.

FIG. 3 illustrates multicast forwarding between linecards within the blade router 100 according to some embodiments of the present invention. In multicast forwarding, data may be transmitted to multiple recipients on the network at the same time using a single transmission stream (at least until distribution to the end users on separate lines occurs), thereby potentially saving considerable bandwidth when compared to unicast forwarding.

In FIG. 3, a first router linecard 300 (BLADE 1) is illustrated having four local ports 302 labeled $I_0$, $I_1$, $I_2$, and $I_3$ with a forwarding engine 304, such as EARL, which contains an FIB 306 with multicast forwarding entries. In addition, a second router linecard 308 (BLADE 2) is illustrated having four local ports 302 labeled $I_4$, $I_5$, $I_6$, and $I_7$ with a forwarding engine 304, such as EARL, which contains an FIB 312 also with multicast forwarding entries. The first and second router linecards 300, 308 may be coupled within the blade router 100 by a virtual interface (V) 210. Interface $I_2$ may be coupled to a network 314 having an IP address in the subnet of 2.x.x.x, and interfaces $I_5$ and $I_6$ may have receivers for the group IP address of 229.1.1.1.

When an incoming data packet is received on interface $I_2$ from network 314 as illustrated in FIG. 3 as an example, an ACL/QoS lookup may be performed on the input interface as described above. After the ACL/QoS policies have been established, the ingress forwarding engine 304, such as EARL, may perform an FIB lookup into FIB 306. Since the packet has a destination of 229.1.1.1, the FIB adjacency may rewrite the packet to interface $I_1$ and the virtual interface 210 (Oif=I1,V). The data packet may also be rewritten to indicate that the packet was received on interface $I_2$ (Rpf=I2). The packet may be forwarded to I1 and the fabric link (i.e., virtual interface 210). The egress forwarding engine 310, such as EARL, may perform a second FIB lookup into FIB 312. The FIB adjacency may then rewrite the data packet to interfaces $I_5$ and $I_6$ (Oif=I5, I6) and may denote that the packet was received on the virtual interface 210 (Rpf=V). The data packet may then leave the blade router 100 out of interfaces $I_5$ and $I_6$ bound for network 316 with receivers for the group IP address of 229.1.1.1.

MPLS Forwarding Example

Figure 4:
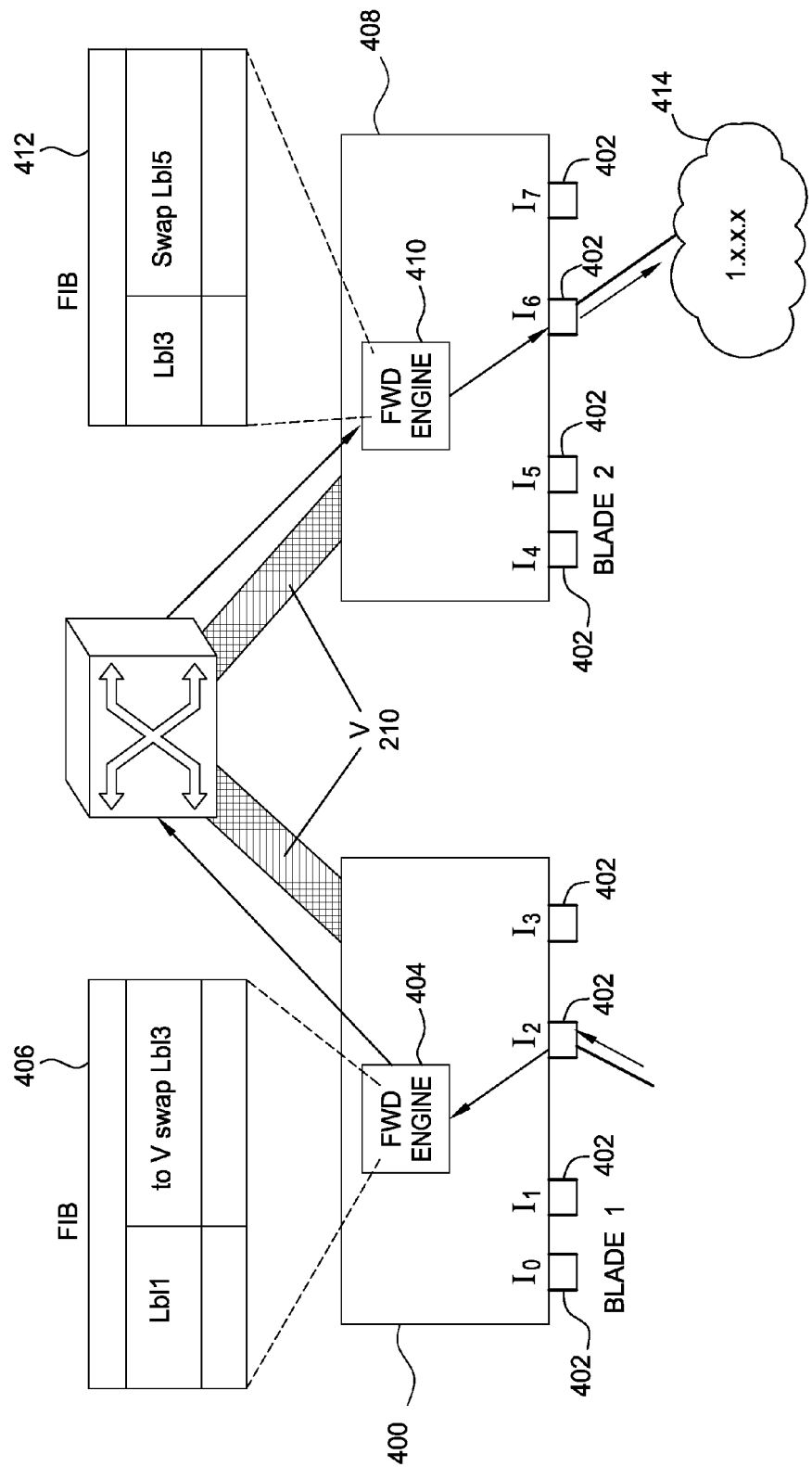
FIG. 4 illustrates Multiprotocol Label Switching (MPLS) forwarding between blades within the blade router in accordance with an embodiment of the present invention.

FIG. 4 illustrates Multiprotocol Label Switching (MPLS) forwarding between linecards within the blade router 100 according to some embodiments of the present invention. MPLS is a standard for including routing information in the packets of an IP network and operates at an OSI model layer that is generally considered to lie between traditional definitions of Layer 2 (data link layer) and Layer 3 (network layer). MPLS works by having label edge routers (LERs) disposed at the edge of the network perform the complex packet analysis and classification before the packet enters the core of the network. The LERs pre-append packets with an MPLS header, containing one or more labels called a label stack. These labels allow MPLS routers within the network core (called label switch routers, or LSRs) to quickly examine the label and forward the packet per its directions without having to look up data in tables and compute the forwarding path each time.

When a labeled packet is received by an MPLS router, the topmost label may be examined. Based on the content of the label, a "swap," "push (impose)," or "pop (dispose)" operation may be performed on the packet's label stack. Routers may have prebuilt lookup tables that tell them which kind of operation to perform based on the topmost label of the incoming packet so these routers can process the packet very quickly. In a swap operation, the label is swapped with a new label, and the packet is forwarded along the path associated with the new label. In a push operation, a new label is pushed on top of the existing label, adding another layer of MPLS. In a pop operation, the label is removed from the packet, which may reveal an inner label below. During these operations, the contents of the packet below the MPLS label stack need not be examined, and the forwarding of the packet may be done based only on the contents of the labels, which allows protocol-independent packet forwarding.

In FIG. 4, a first router linecard 400 (BLADE 1) is illustrated having four local ports 402 labeled $I_0$, $I_1$, $I_2$, and $I_3$ with a forwarding engine 404, such as EARL, which contains an FIB 406 with MPLS forwarding entries. In addition, a second router linecard 408 (BLADE 2) is illustrated having four local ports 402 labeled $I_4$, $I_5$, $I_6$, and $I_7$ with a forwarding engine 410, such as EARL, which contains an FIB 412 also with MPLS forwarding entries. The first and second router linecards 400, 408 may be coupled within the blade router 100 by a virtual interface (V) 210. Interface $I_2$ may be coupled to a network (not shown), and interface $I_6$ may be coupled to a network 414 having an IP address in the subnet of 1.x.x.x.

When an incoming data packet is received on interface $I_2$ from the network as illustrated in FIG. 4 as an example, an ACL/QoS lookup may be performed on the input interface as described above. After the ACL/QoS policies have been established, the ingress forwarding engine 404, such as EARL, may perform an FIB lookup using FIB 406. Since the packet may have had a label Lbl1 which the MPLS-capable linecard 400 recognizes, the FIB adjacency may rewrite the packet to the virtual interface 210 and swap the label Lbl1 for a new label Lbl3 (to V swap Lbl3). The egress forwarding engine 410, such as EARL, may perform a second FIB lookup into FIB 412 and recognize the Lbl3 label. The FIB adjacency may then rewrite the data packet to interfaces $I_6$ and swap the label Lbl3 for a new label Lbl5 (swap Lbl5). The data packet may then leave the blade router 100 out of interface $I_6$ bound for network 414 with an IP address in the subnet of 1.x.x.x.

Multiple Virtual Interfaces

Figure 5:
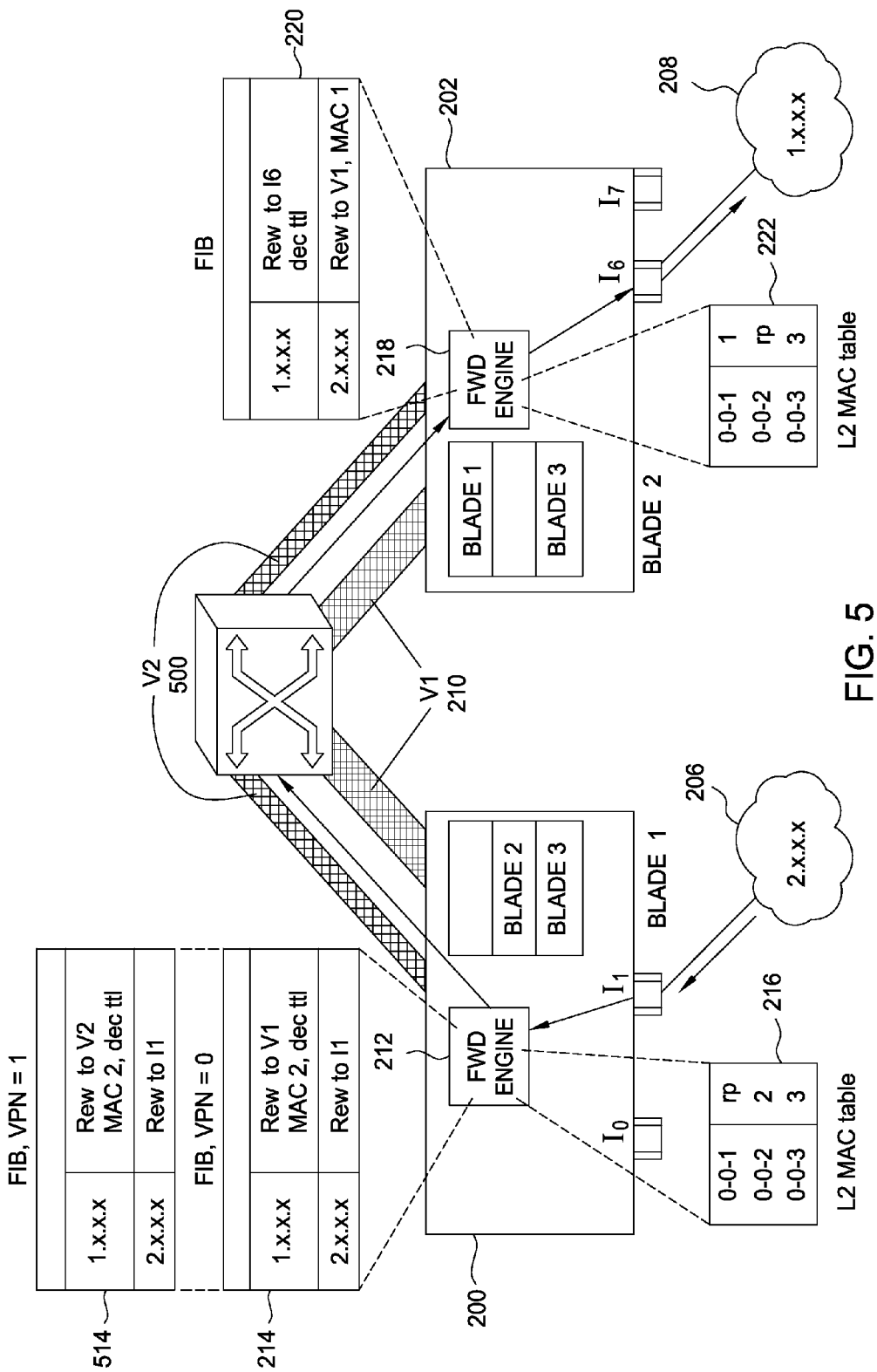
FIG. 5 illustrates Network Address Translation (NAT)-enabled blade-to-blade forwarding within the blade router using two copies of a forwarding information base (FIB) table in accordance with an embodiment of the present invention.

For some embodiments of the blade router, more than one virtual interface may be employed as illustrated in FIG. 5. In FIG. 5, there is a first virtual interface (V1) 210 as described above and a second virtual interface (V2) 500 linking the plurality of router linecards together, including the first and second router linecards 200, 202 depicted. A second virtual interface may provide a means for handling ingress-dependent egress features (i.e., features on an egress router linecard that use ingress linecard interface information), such as Network Address Translation (NAT), on the blade router.

An Internet Engineering Task Force (IETF) standard, NAT permits a group to present itself to the Internet with far fewer Internet Protocol (IP) addresses than nodes existing on its internal network. NAT technology converts private IP addresses of a client machine on the internal private network to one or more public IP addresses for the Internet when the packet traverses from the internal to an external network.

To accomplish this, the NAT-implementing machine (e.g., a router, firewall, or computer) updates the packet headers with the new address and keeps track of the new headers via internal tables that the machine constructs. When packets return from the Internet, NAT uses the tables to perform the reverse conversion to the IP address of the client machine. NAT not only conserves public IP addresses, but also enhances security by hiding internal addresses from the outside world. Since translation may be performed only if the packet traverses from an internal to an external network, NAT implementation typically looks at both input and output interfaces before performing the NAT translation. Thus, only traffic between a NAT inside interface and a NAT outside interface may be subject to translation.

Accordingly, NAT may most likely not function in the blade router described above without the egress router linecard knowing the ingress linecard interface information. In order to support NAT on the blade router, two virtual interfaces may be employed as portrayed in FIG. 5. The first virtual interface (V1) 210 may be designated for regular interface traffic and routing protocols, where the egress linecard need not know the ingress linecard interface information as described above. The second virtual interface (V2) 500 may be designated for NAT-enabled traffic. Both first and second virtual interfaces 210 and 500 may be established on a single local area network (LAN) segment connecting all of the router linecards in the blade router chassis together.

A selection parameter may be used by the ingress router linecard to determine if the traffic is coming from a NAT-enabled interface, and the ingress router linecard may update its FIB accordingly in an effort to know whether to forward packets to the egress router linecard on V1 210 or V2 500. For some embodiments, as illustrated in FIG. 5, the selection may be achieved by using a different Virtual Private Network (VPN) on NAT-enabled interfaces compared to regular interfaces. For example, the forwarding engine 212 within the first router linecard 200 may contain an FIB 214 after configuration of the blade router 100 that indicates routing incoming data packets to a local interface, such as $I_0$ and $I_1$, or to V1 210 when the internal VPN is 0. The forwarding engine 212 may also contain an additional FIB 514 that is a copy of the original FIB 214 with the same entries, except that the additional FIB 514 routes incoming data packets to the second virtual interface (V2) 500 when a different internal VPN (referred to as a NAT VPN) is used (i.e., VPN=1) instead of to V1 210.

The routing of incoming data packets is similar to that described above for unicast forwarding with the blade router, with the addition of determining which of the two FIBs 214, 514 to read based on whether the NAT VPN is being used. On the egress blade, the second virtual interface 500 may be designated as a NAT inside interface, and the processing of the packets on the egress blade may be similar to any typical router.

Figure 6:
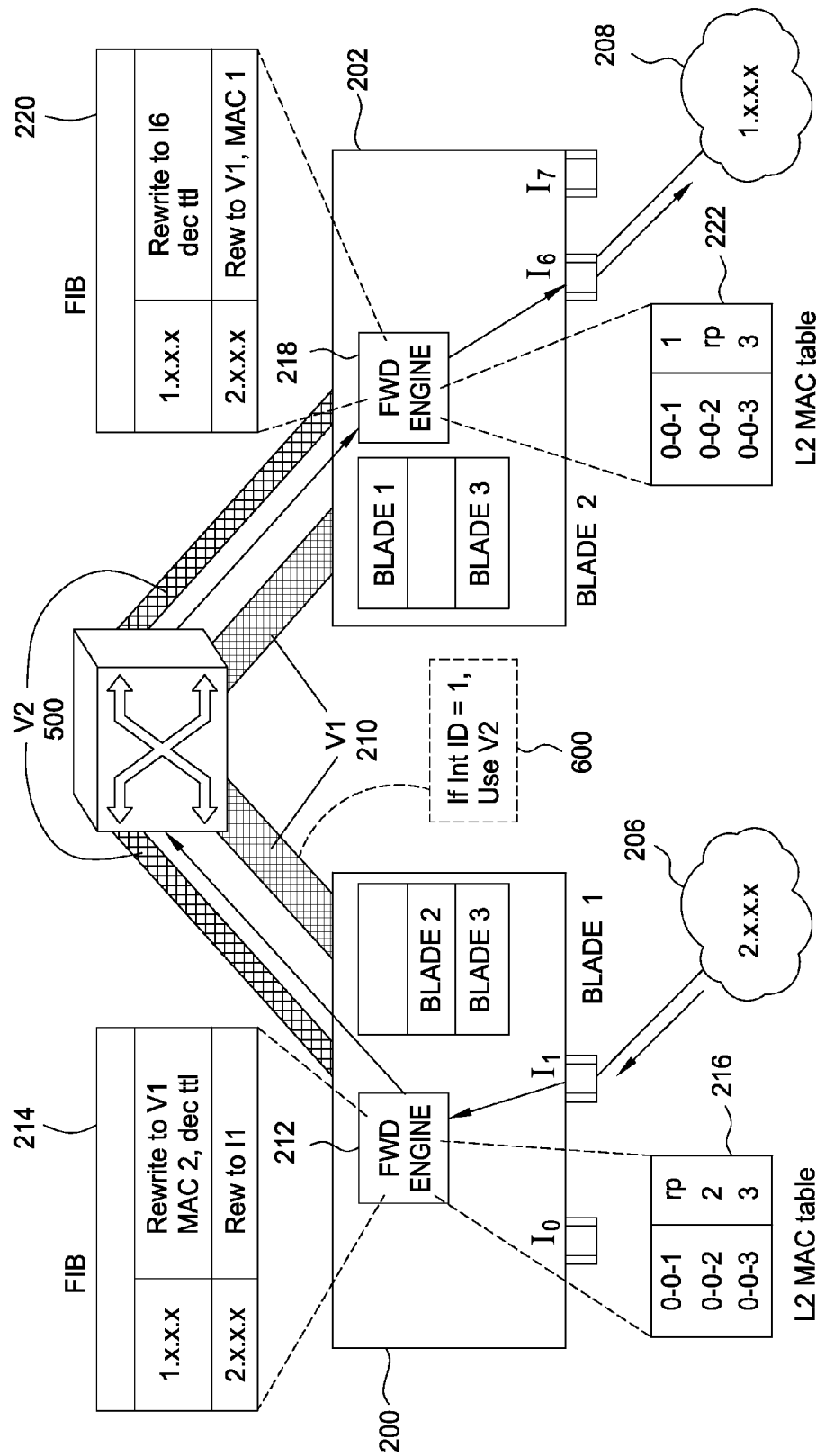
FIG. 6 illustrates NAT-enabled blade-to-blade forwarding within the blade router using an egress policy on a virtual interface in accordance with an embodiment of the present invention.

For other embodiments, as illustrated in FIG. 6, the selection may be achieved by using an egress policy on the first virtual interface (V1) 210. In this scheme, an egress policy 600 may be attached to V1 that alters the outgoing interface identifier (Int Id) to the second virtual interface (V2) 500 for matched traffic. The interface identifier may be set to a NAT identifier for NAT inside interfaces so that only incoming data packets from NAT inside interfaces are matched according to this policy. This type of forwarding may be performed using only a single FIB per router linecard and, as such, may be easily scaled.

For example, the forwarding engine 212 within the first router linecard 200 may contain an FIB 214 after configuration of the blade router 100 that indicates routing incoming data packets to a local interface, such as $I_0$ and $I_1$, or to the first virtual interface. In this example, if an incoming data packet is to be rewritten to V1 210 and the Int Id=0 (indicating that this is not a NAT inside interface), then the incoming data packet may continue using V1 210 as the virtual interface to forward packets among router linecards 104 in the blade router 100. However, if the Int Id=1 (indicating that this is a NAT inside interface), then the incoming data packet may be rewritten to V2 500 according to the egress policy 600 on V1 210.

Although FIGS. 5 and 6 illustrate examples of NAT-enabled blade-to-blade forwarding within a blade router, two or more virtual interfaces may be utilized in a similar manner for any suitable egress feature that depends on the ingress interface.

CONCLUSION

The blade router may address interface scalability by having each of the linecards manage its interfaces locally and use the concept of virtual and local interfaces for intelligent forwarding while appearing as a single router from the customer perspective. In other words, the plurality of linecards may operate as separate routers with each linecard having its own FIB, but the linecards may be configured to act as one router in the control plane (i.e., network-in-a-box). For some embodiments, two virtual interfaces may be used, one for regular interface traffic and another for NAT-enabled interface traffic.

While the foregoing is directed to embodiments of the present invention, other and further embodiments of the invention may be devised without departing from the basic scope thereof, and the scope thereof is determined by the claims that follow.

The invention claimed is:

1. A network routing system, comprising:
a chassis;
a plurality of router linecards disposed in the chassis, each of the router linecards comprising a plurality of local interfaces and a forwarding engine configured to route received packets to one of the plurality of local interfaces on the respective router linecard; and
first and second virtual interfaces for routing received packets between a first linecard of the plurality of router linecards and a second linecard of the plurality of router linecards, each of the router linecards maintaining a virtual forwarding information base (FIB) for routing received packets on one of the first and second virtual interfaces,
wherein both the first virtual interface and the second virtual interface route data on a shared physical communication link coupling the plurality of router linecards in the chassis, wherein routing on the first and second virtual interfaces is governed by an egress policy, and
wherein the egress policy routes the received packets from the first linecard to the second linecard using the second virtual interface if the received packets were received at a Network Address Translation (NAT)-enabled local interface of the first linecard, and the egress policy routes the received packets from the first linecard to the second linecard using the first virtual interface if the received packets were received on a non-NAT-enabled local interface of the first linecard.

2. The system of claim 1, further comprising a controller, wherein the controller is adapted to configure the plurality of router linecards as a single router.

3. The system of claim 1, wherein the first linecard runs a different operating system or a different version of a forwarding engine than the second linecard.

4. The system of claim 1, wherein the system appears as a plurality of routers from a data plane perspective and as a single router from a control plane perspective and a management plane perspective.

5. The system of claim 1, wherein the shared communication link is an internal local area network (LAN) segment of the chassis that connects all of the plurality of router linecards.

6. A method comprising:
  receiving a packet at a first router linecard of a plurality of router linecards disposed in a chassis, wherein each of the router linecards comprises a plurality of local interfaces, a forwarding information base (FIB), and a forwarding engine configured to route incoming packets;
  forwarding the packet from the first router linecard to a second router linecard of the plurality of router linecards on a first or a second virtual interface for routing incoming packets between two or more of the plurality of router linecards based on one or more selection criteria, the selection criteria comprising whether the packet was received on a Network Address Translation (NAT)-enabled local interface of the first router linecard,
  wherein both the first virtual interface and the second virtual interface route data on a shared physical communication link coupling the plurality of router linecards in the chassis, and
  wherein forwarding the packet from the first router linecard to the second router linecard includes:
    forwarding the packet to the second virtual interface if the selection criteria indicates that the packet was received on the NAT-enabled local interface of the first router linecard, and
    forwarding the packet to the first virtual interface if the selection criteria indicates that the packet was received on a non-NAT-enabled local interface of the first router linecard; and
  receiving the packet from the first or the second virtual interface at the second router linecard.

7. The method of claim 6, wherein the first linecard maintains a first FIB for forwarding the packet when the packet is received at the non-NAT-enabled local interface and a second FIB for forwarding the packet when the packet is received at the NAT-enabled local interface.

8. The method of claim 6, wherein the first linecard runs a different operating system or a different version of a forwarding engine than the second linecard.

9. The method of claim 6, wherein the shared communication link is an internal local area network (LAN) segment in the chassis that connects all of the plurality of router linecards.

10. A method comprising:
  configuring a virtual forwarding information base (FIB) of a first router linecard of a plurality of router linecards disposed in a chassis to forward a packet using one of a first and second virtual interface for routing the packet between two or more of the plurality of router linecards if (i) the packet is to be forwarded to a second router linecard in the plurality and (ii) if the packet meets one or more selection criteria, the selection criteria comprising whether the packet was received on a Network Address Translation (NAT)-enabled local interface of the first router linecard, wherein
    both the first virtual interface and the second virtual interface route data on a shared physical communication link coupling the plurality of router linecards in the chassis,
    the packet is forwarded from the first router linecard to the second router linecard on the second virtual interface if the selection criteria indicates that the packet was received on the NAT-enabled local interface of the first router linecard, and the packet is forwarded from the first router linecard to the second router linecard on the first virtual interface if the selection criteria indicates that the packet was received on a non-NAT-enabled local interface of the first router linecard, and
    each of the plurality of router linecards comprises a plurality of local interfaces and a forwarding engine configured to route incoming packets to one of the plurality of local interfaces on the respective router linecard or one of the first and second virtual interfaces;
  configuring an FIB of the second router linecard to forward the packet to one of the plurality of local interfaces of the second router linecard if received from the first or the second virtual interface; and
  configuring the virtual FIB of the first router linecard to forward the packet to one of the plurality of local interfaces of the first router linecard if the packet is to be forwarded within the first router linecard.

11. The method of claim 10, wherein the selection criteria comprise whether the packet is NAT-enabled based on an interface identifier matching a NAT identifier.

12. The method of claim 10, wherein configuring the virtual FIB of the first router linecard is performed by a controller which considers the plurality of router linecards as a single router during the configuring.

* * * * *